United States Patent
Klacar et al.

(10) Patent No.: US 10,482,050 B2
(45) Date of Patent: Nov. 19, 2019

(54) LINK ROLE DETERMINATION IN A DUAL-MODE PERIPHERAL COMPONENT INTERCONNECT EXPRESS (PCIE) DEVICE

(71) Applicant: QUALCOMM Incorporated, San Diego, CA (US)

(72) Inventors: Neven Klacar, Encinitas, CA (US); Yan He, San Diego, CA (US); Murali Krishna, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 103 days.

(21) Appl. No.: 15/722,783

(22) Filed: Oct. 2, 2017

(65) Prior Publication Data

US 2018/0129623 A1 May 10, 2018

Related U.S. Application Data

(60) Provisional application No. 62/419,517, filed on Nov. 9, 2016.

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0026* (2013.01)

(58) Field of Classification Search
CPC . G06F 13/4027; G06F 13/4282; G06F 13/385
See application file for complete search history.

(56) References Cited

U.S. PATENT DOCUMENTS 7,793,010 B2 * 9/2010 Olson ................. G06F 13/4282
710/14
8,533,379 B2 * 9/2013 Evoy ................... G06F 13/4282
710/313

(Continued)

FOREIGN PATENT DOCUMENTS

WO 2009027189 A1 3/2009

OTHER PUBLICATIONS

International Search Report and Written Opinion for PCT/US2017/054938, dated Dec. 19, 2017, 12 pages.

(Continued)

*Primary Examiner* — Henry Tsai
*Assistant Examiner* — Christopher Daley
(74) *Attorney, Agent, or Firm* — Withrow & Terranova, PLLC (57) ABSTRACT

Link role determination in a dual-mode Peripheral Component Interconnect express (PCIe) device is disclosed. In this regard, determining a link role for a dual-mode PCIe device involves configuring the dual-mode PCIe device to operate in a root complex (RC) mode or an endpoint mode. The dual-mode PCIe device first performs a configuration and initiation sequence on a wire-based PCIe link in the RC mode. If the configuration and initiation sequence on the wire-based PCIe link is unsuccessful, then the dual-mode PCIe device invokes a random delay and switches to the endpoint mode at expiration of the random delay. By determining a link role of the dual-mode PCIe device based on the configuration and initiation sequence, it is possible to configure dynamically the dual-mode PCIe device to operate in the RC mode or the endpoint mode, thus allowing flexible configuration of the dual-mode PCIe device based on various application scenarios.

30 Claims, 7 Drawing Sheets

(56) References Cited

U.S. PATENT DOCUMENTS

| | | | | |
|---|---|---|---|---|
| 9,262,360 B2* | 2/2016 | Wagh | ............... | H04L 41/0896 |
| 9,282,489 B2* | 3/2016 | Ezell | ............... | H04W 36/0022 |
| 9,760,455 B2* | 9/2017 | Lee | ............... | G06F 11/2033 |
| 9,842,075 B1* | 12/2017 | Davis | ............... | G06F 13/385 |
| 9,996,484 B1* | 6/2018 | Davis | ............... | G06F 13/105 |
| 2009/0063894 A1* | 3/2009 | Billau | ............... | G06F 11/2005 |
| | | | | 714/5.11 |
| 2011/0185103 A1* | 7/2011 | Evoy | ............... | G06F 13/4282 |
| | | | | 710/313 |
| 2013/0051483 A1* | 2/2013 | Wyatt | ............... | H04L 25/03885 |
| | | | | 375/259 |
| 2015/0121129 A1* | 4/2015 | Hori | ............... | G06F 11/2092 |
| | | | | 714/6.22 |
| 2015/0186310 A1 | 7/2015 | Levy | | |
| 2016/0170929 A1 | 6/2016 | Pethe et al. | | |
| 2016/0210258 A1* | 7/2016 | Shen | ............... | G06F 13/4027 |
| 2017/0097910 A1* | 4/2017 | Kumar A V | ............... | G06F 13/28 |

OTHER PUBLICATIONS

Second Written Opinion for PCT/US2017/054938, dated Oct. 15, 2018, 5 pages.
International Preliminary Report on Patentability for PCT/US2017/054938, dated Feb. 8, 2019, 6 pages.

\* cited by examiner

LINK ROLE DETERMINATION IN A DUAL-MODE PERIPHERAL COMPONENT INTERCONNECT EXPRESS (PCIE) DEVICE

PRIORITY CLAIM

The present application claims priority to U.S. Provisional Patent Application Ser. No. 62/419,517 filed on Nov. 9, 2016 and entitled "LINK ROLE DETERMINATION IN A DUAL-MODE PERIPHERAL COMPONENT INTERCONNECT EXPRESS (PCIe) DEVICE," the contents of which is incorporated herein by reference in its entirety.

BACKGROUND

I. Field of the Disclosure

The technology of the disclosure relates generally to Peripheral Component Interconnect express (PCIe).

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile multimedia centers that enable enhanced user experiences. Such increased functionality is enabled by the inclusion of evermore complex integrated circuits (ICs) within mobile communication devices. As the number and complexity of ICs within mobile communication devices has increased, so has the need for the various ICs to communicate with one another.

Figure 1:
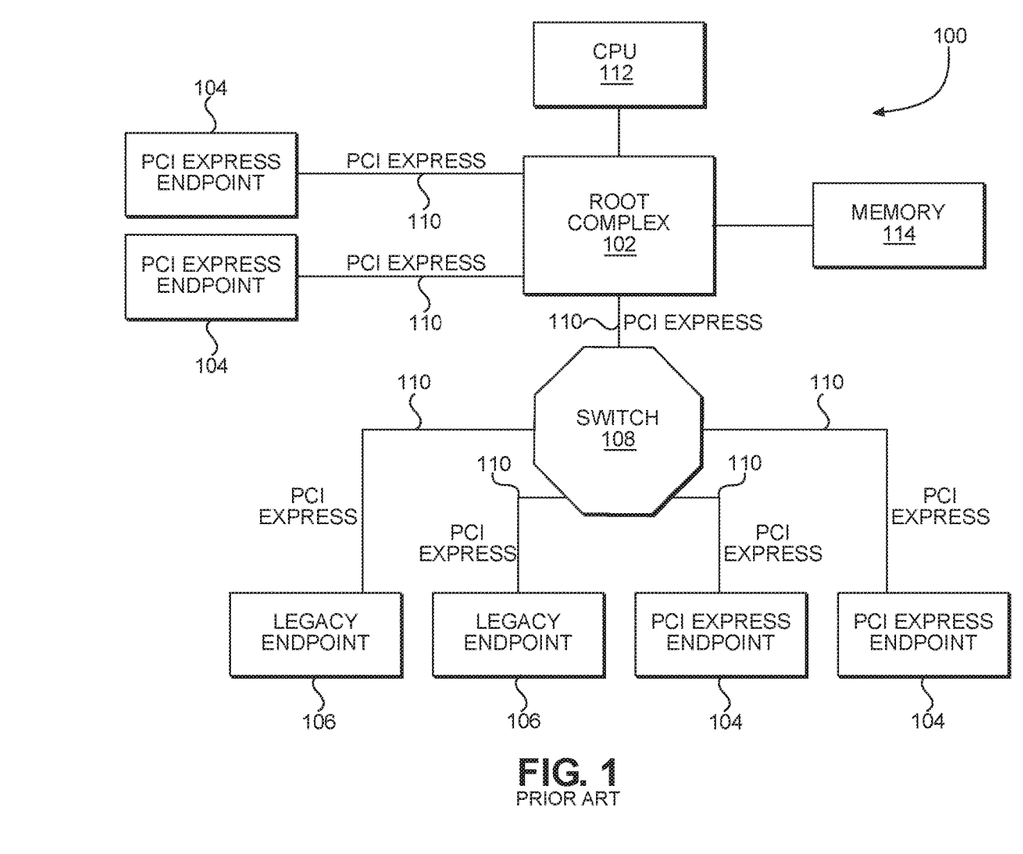
FIG. 1 is a schematic diagram of an exemplary topology of a Peripheral Component Interconnect express (PCIe) system as defined in the PCIe Base Specification Revision 3.0, published by the peripheral component interconnect (PCI) special interest group (SIG) (PCI-SIG) on Nov. 10, 2010.

Several standards have been published outlining various protocols that allow ICs to communicate with one another. A popular protocol is the Peripheral Component Interconnect (PCI) protocol, which includes the PCI express (PCIe) protocol. In this regard, FIG. 1 is a schematic diagram of an exemplary topology of a PCIe system 100 as defined in the PCIe Base Specification Revision 3.0, published by the Peripheral Component Interconnect (PCI) Special Interest Group (SIG) (PCI-SIG) on Nov. 10, 2010.

The PCIe system 100 includes a root complex (RC) 102, one or more PCIe endpoints 104, one or more legacy PCIe endpoints 106, and a switch 108 all interconnected via PCIe links 110. The RC 102 denotes the root of an input/output (I/O) hierarchy that connects a central processing unit (CPU) 112 and/or a memory 114 to the PCIe endpoints 104, the legacy PCIe endpoints 106, and the switch 108 in the PCIe system 100. In this regard, the RC 102 is functionally equivalent to a router in the PCIe system 100 to route peer-to-peer transactions between the CPU 112, the memory 114, the PCIe endpoints 104, the legacy PCIe endpoints 106, and the switch 108. In this regard, the RC 102 effectuates a point-to-multipoint topology in the PCIe system 100. In the PCIe system 100, the RC 102 may be configured to assume RC functionalities via jumpers and/or registers, for example.

SUMMARY OF THE DISCLOSURE

Aspects disclosed in the detailed description include link role determination in a dual-mode Peripheral Component Interconnect express (PCIe) device. In this regard, link role determination involves configuring a dual-mode PCIe device to operate in a root complex (RC) mode or an endpoint mode. Given that only one PCIe device can operate in the RC mode in a PCIe system, link role determination further involves resolving potential link role collision when multiple PCIe devices attempt to operate in the RC mode concurrently. In a first non-limiting example, one of the multiple PCIe devices is a single-mode PCIe device preconfigured (e.g., via jumpers and/or registers) to function in the RC mode. As such, link role determination causes all dual-mode PCIe devices to operate in the endpoint mode. In a second non-limiting example, all of the multiple PCIe devices are dual-mode PCIe devices. Accordingly, link role determination causes one of the dual-mode PCIe devices to operate in the RC mode.

In this regard, a dual-mode PCIe device first performs a configuration and initiation sequence on a wire-based PCIe link in the RC mode. If the configuration and initiation sequence on the wire-based PCIe link is unsuccessful, then the dual-mode PCIe device invokes a random back-off (also referred to as a delay) and switches to the endpoint mode at expiration of the random delay, while continuing to try to perform the configuration and initiation sequence. As such, in the first non-limiting example above, all of the dual-mode PCIe devices will eventually switch to operate in the endpoint mode, thus allowing the preconfigured single-mode PCIe device to operate in the RC mode. In the second non-limiting example above, the dual-mode PCIe device invoking the longest random delay will be the last device to operate in the RC mode and will perform the configuration and initiation sequence such that this device ends up being the RC. By determining a link role of the dual-mode PCIe device based on the configuration and initiation sequence, it is possible to configure dynamically the dual-mode PCIe device to operate in the RC mode or the endpoint mode, thus allowing flexible configuration of the dual-mode PCIe device based on various application scenarios.

In this regard, in one aspect, a dual-mode PCIe device is provided. The dual-mode PCIe device is configured to operate in an RC mode or an endpoint mode. The dual-mode PCIe device includes a bus interface configured to be coupled to a wire-based PCIe link. The dual-mode PCIe device also includes control circuitry. The control circuitry is configured to initialize the dual-mode PCIe device into the RC mode. The control circuitry is also configured to perform a configuration and initiation sequence on the wire-based PCIe link via the bus interface. The control circuitry is also configured to determine a link state of the wire-based PCIe link upon completion of the configuration and initiation sequence. The control circuitry is also configured to use a random delay when the link state indicates that the configuration and initiation sequence performed on the wire-based PCIe link is unsuccessful. The control circuitry is also configured to switch the dual-mode PCIe device to the endpoint mode at expiration of the random delay.

In another aspect, a method for configuring a dual-mode PCIe device to operate in an RC mode or an endpoint mode is provided. The method includes initializing the dual-mode PCIe device into the RC mode. The method also includes performing a configuration and initiation sequence on a wire-based PCIe link coupled to the dual-mode PCIe device. The method also includes determining a link state of the wire-based PCIe link upon completion of the configuration and initiation sequence. The method also includes using a random delay when the link state indicates that the configuration and initiation sequence performed on the wire-based PCIe link is unsuccessful. The method also includes switching the dual-mode PCIe device to the endpoint mode at expiration of the random delay.

In another aspect, a PCIe system is provided. The PCIe system includes a dual-mode PCIe device configured to operate in an RC mode or an endpoint mode. The dual-mode PCIe device includes a bus interface configured to be coupled to a wire-based PCIe link. The dual-mode PCIe device also includes control circuitry. The control circuitry is configured to initialize the dual-mode PCIe device into the RC mode. The control circuitry is also configured to perform a configuration and initiation sequence on the wire-based PCIe link via the bus interface. The control circuitry is also configured to determine a link state of the wire-based PCIe link upon completion of the configuration and initiation sequence. The control circuitry is also configured to use a random delay when the link state indicates that the configuration and initiation sequence performed on the wire-based PCIe link is unsuccessful. The control circuitry is also configured to switch the dual-mode PCIe device to the endpoint mode at expiration of the random delay. The PCIe system also includes a second dual-mode PCIe device configured to operate in the RC mode or the endpoint mode. The second dual-mode PCIe device includes a second bus interface configured to be coupled to the wire-based PCIe link. The second dual-mode PCIe device also includes second control circuitry. The second control circuitry is configured to initialize the second dual-mode PCIe device into the RC mode. The second control circuitry is also configured to perform a second configuration and initiation sequence on the wire-based PCIe link via the second bus interface. The second control circuitry is also configured to determine a second link state of the wire-based PCIe link upon completion of the second configuration and initiation sequence. The second control circuitry is also configured to use a second random delay when the second link state indicates that the second configuration and initiation sequence performed on the wire-based PCIe link is unsuccessful. The second control circuitry is also configured to switch the second dual-mode PCIe device to the endpoint mode at expiration of the second random delay.

In another aspect, a dual-mode PCIe device configured to switch dynamically between an RC mode and an endpoint mode is provided. The dual-mode PCIe device includes a bus interface configured to be coupled to a wire-based PCIe link. The dual-mode PCIe device also includes control circuitry. The control circuitry is configured to initialize the dual-mode PCIe device into the RC mode. The control circuitry is also configured to perform a configuration and initiation sequence on the wire-based PCIe link via the bus interface. The control circuitry is also configured to determine a link state of the wire-based PCIe link upon completion of the configuration and initiation sequence. The control circuitry is also configured to switch to the endpoint mode when the link state indicates that the configuration and initiation sequence performed on the wire-based PCIe link is unsuccessful and after expiration of a delay.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include link role determination in a dual-mode Peripheral Component Interconnect express (PCIe) device. In this regard, link role determination involves configuring a dual-mode PCIe device to operate in a root complex (RC) mode or an endpoint mode. Given that only one PCIe device can operate in the RC mode in a PCIe system, link role determination further involves resolving potential link role collision when multiple PCIe devices attempt to operate in the RC mode concurrently. In a first non-limiting example, one of the multiple PCIe devices is a single-mode PCIe device preconfigured (e.g., via jumpers and/or registers) to function in the RC mode. As such, link role determination causes all dual-mode PCIe devices to operate in the endpoint mode. In a second non-limiting example, all of the multiple PCIe devices are dual-mode PCIe devices. Accordingly, link role determination causes one of the dual-mode PCIe devices to operate in the RC mode.

In this regard, a dual-mode PCIe device first performs a configuration and initiation sequence on a wire-based PCIe link in the RC mode. If the configuration and initiation sequence on the wire-based PCIe link is unsuccessful, then the dual-mode PCIe device invokes a random back-off (also referred to as a delay) and switches to the endpoint mode at expiration of the random delay, while continuing to try to perform the configuration and initiation sequence. As such, in the first non-limiting example above, all of the dual-mode PCIe devices will eventually switch to operate in the endpoint mode, thus allowing the preconfigured single-mode PCIe device to operate in the RC mode. In the second non-limiting example above, the dual-mode PCIe device invoking the longest random delay will be the last device to operate in the RC mode and will perform the configuration and initiation sequence such that this device ends up being the RC. By determining a link role of the dual-mode PCIe device based on the configuration and initiation sequence, it is possible to configure dynamically the dual-mode PCIe device to operate in the RC mode or the endpoint mode, thus allowing flexible configuration of the dual-mode PCIe device based on various application scenarios.

Figure 2:
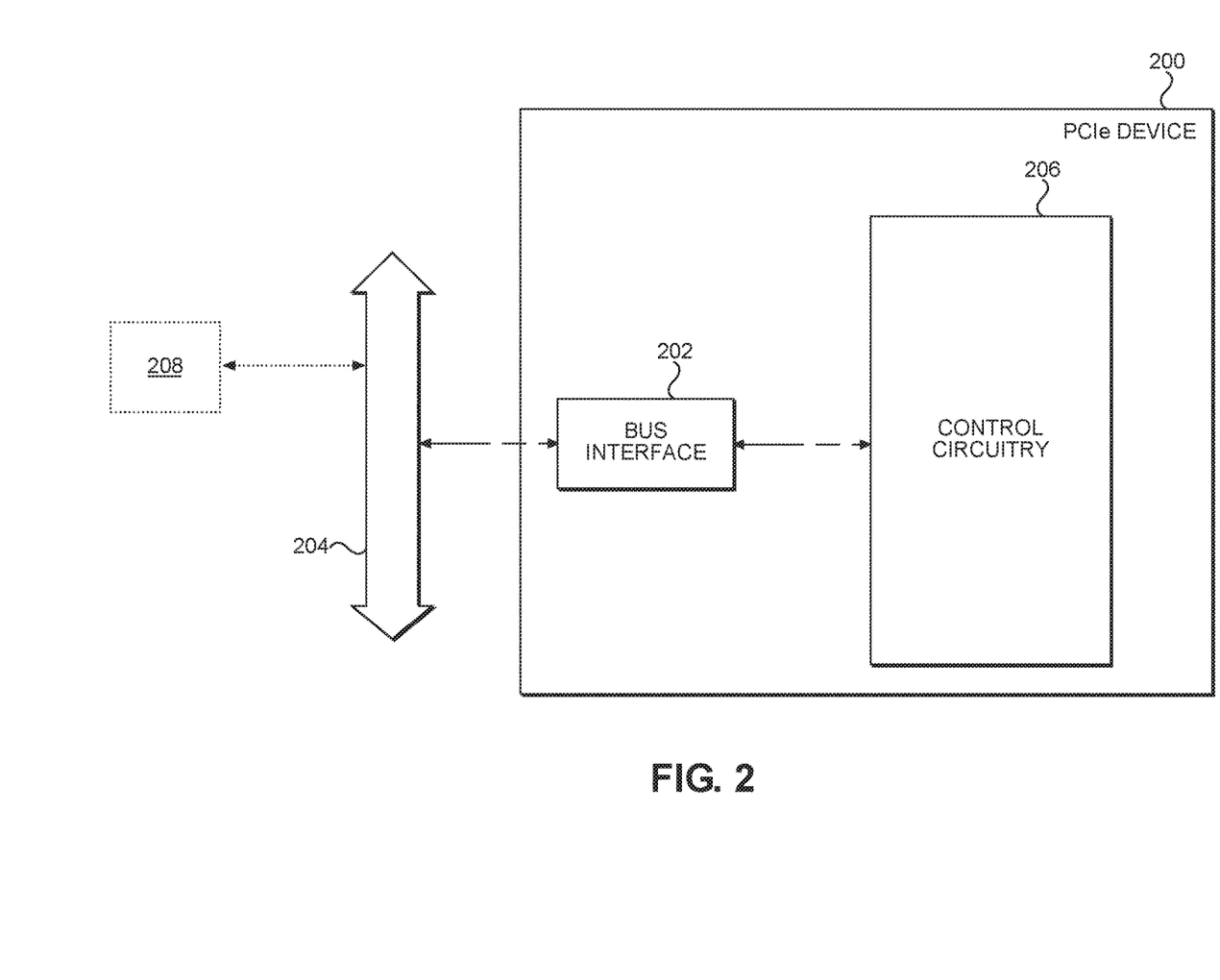
FIG. 2 is a schematic diagram of an exemplary dual-mode PCIe device that can be configured to operate in a root complex (RC) mode or an endpoint mode.

In this regard, FIG. 2 is a schematic diagram of an exemplary dual-mode PCIe device 200 that can be configured to operate in an RC mode or an endpoint mode. The dual-mode PCIe device 200 includes a bus interface 202 configured to be coupled to a wire-based PCIe link 204. The dual-mode PCIe device 200 includes control circuitry 206 that is communicatively coupled to the wire-based PCIe link 204 via the bus interface 202. The control circuitry 206 is configured to determine the link state (i.e., the RC mode or the endpoint mode) of the dual-mode PCIe device 200 based on a procedure further discussed below.

The control circuitry 206 first initializes the dual-mode PCIe device 200 into the RC mode. The control circuitry 206 then performs a configuration and initiation sequence on the wire-based PCIe link 204 via the bus interface 202. The configuration and initiation sequence is used in the PCIe system as defined in the PCIe Base Specification Revision 3.0, published by the Peripheral Component Interconnect (PCI) Special Interest Group (SIG) (PCI-SIG) on Nov. 10, 2010 (hereinafter "PCIe Specification"). According to the PCIe Specification, the control circuitry 206 may enable a Link Training and Status state machine (LTSSM) prior to performing the configuration and initiation sequence on the wire-based PCIe link 204. The control circuitry 206 determines a link state of the wire-based PCIe link 204 upon completion of the configuration and initiation sequence. The link state of the wire-based PCIe link 204 can be determined based on processes defined in the PCIe Specification.

The control circuitry 206 invokes a random delay or back-off when the link state indicates that the configuration and initiation sequence performed on the wire-based PCIe link 204 is unsuccessful. The length of the delay may be tracked by a counter or the like. The configuration and initiation sequence can be determined to be unsuccessful when the wire-based PCIe link 204 is not up and functional after the configuration and initiation sequence is completed. In a first non-limiting example, the unsuccessful configuration and initiation of the wire-based PCIe link 204 may be a result of a single-mode PCIe device 208, which is pre-configured (e.g., via jumpers and/or registers) to operate in the RC mode, also attempting to perform the configuration and initiation sequence on the wire-based PCIe link 204. In this regard, there can be a link role collision between the dual-mode PCIe device 200 and the single-mode PCIe device 208. As further discussed below, the link role collision can be resolved by the random delay invoked by the dual-mode PCIe device 200.

With continuing reference to FIG. 2, the control circuitry 206 is configured to disable the LTSSM and then switch the dual-mode PCIe device 200 to the endpoint mode at the expiration of the random delay. In a non-limiting example, the random delay corresponds to a temporal delay between fifty and one hundred milliseconds (50-100 ms). In another non-limiting example, the control circuitry 206 can invoke the random delay after an initial delay of one millisecond (1 ms) from determining that the configuration and initiation sequence performed on the wire-based PCIe link 204 is unsuccessful.

In contrast, the control circuitry 206 can configure the dual-mode PCIe device 200 to operate in the RC mode when the link state indicates that the configuration and initiation sequence performed on the wire-based PCIe link 204 is successful. Hence, by determining the link role of the dual-mode PCIe device 200 based on the configuration and initiation sequence, it is possible to configure dynamically the dual-mode PCIe device 200 to operate in the RC mode or the endpoint mode, thus allowing flexible configuration of the dual-mode PCIe device 200 based on various application scenarios.

The control circuitry 206 may configure the dual-mode PCIe device 200 to operate in the RC mode or the endpoint mode according to a process. In this regard, FIG. 3 is a flowchart of a process 300 that can be performed by the control circuitry 206 of FIG. 2 to configure the dual-mode PCIe device 200 to operate in the RC mode or the endpoint mode.

Figure 3:
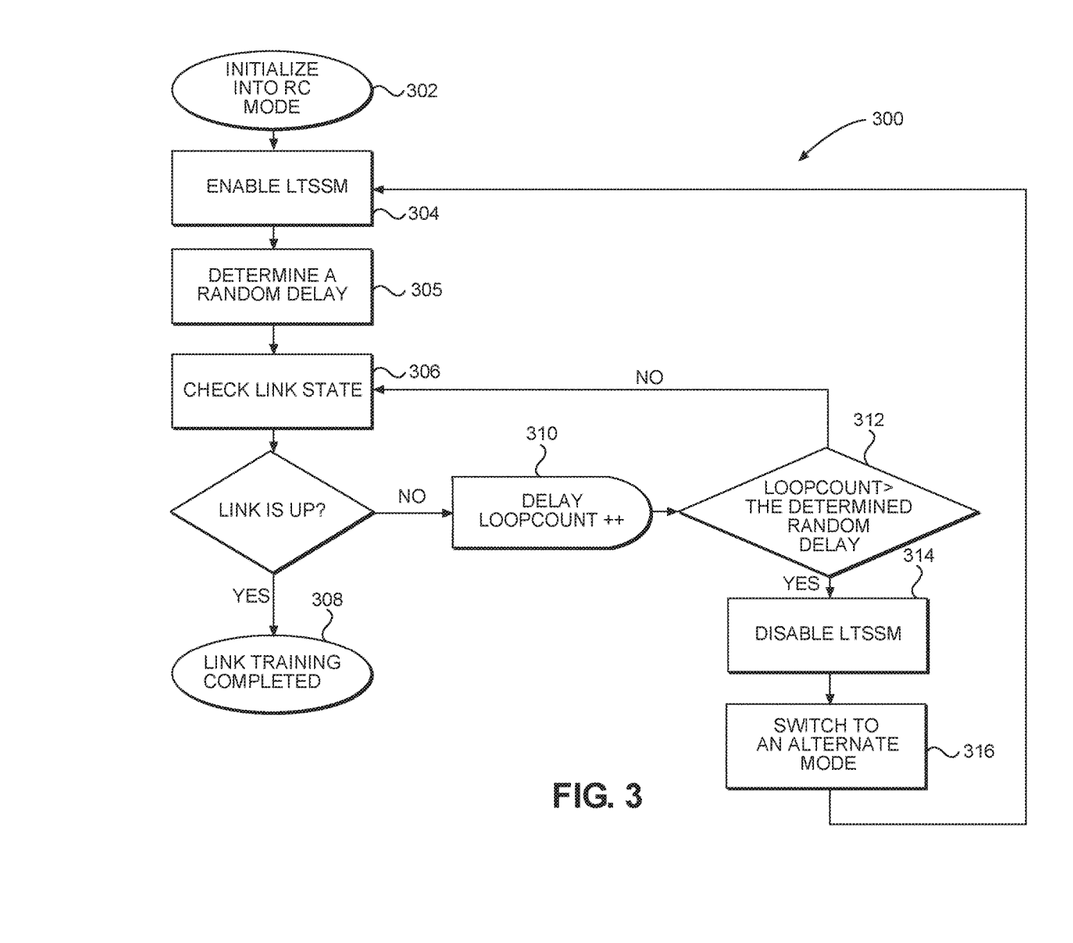
FIG. 3 is a flowchart of a process that can be performed by control circuitry in the dual-mode PCIe device of FIG. 2 to configure the dual-mode PCIe device to operate in the RC mode or the endpoint mode.

With reference to FIG. 3, the control circuitry 206 first initiates the dual-mode PCIe device 200 into the RC mode (block 302). The control circuitry 206 then enables the LTSSM to perform the configuration and initiation sequence as described in the PCIe Specification (block 304). Upon completion of the configuration and initiation sequence, the control circuitry 206 determines a random delay (block 305). In a non-limiting example, the random delay can be between 50-100 ms. Note that as part of the process 300, the loop count may initially be set to zero. The precise timing of this initial value may take place during blocks 304, 305, before block 306, or immediately after block 306. Subsequently, the control circuitry 206 checks the link state of the wire-based PCIe link 204 (block 306) to determine whether the wire-based PCIe link 204 is up and functional. If the link state indicates that the wire-based PCIe link 204 is up and functional, the control circuitry 206 completes link training (block 308) and the dual-mode PCIe device 200 operates in the RC mode. If the link state indicates that the wire-based PCIe link 204 is not up and functional, then the control circuitry 206 may invoke a delay and increment a loop counter (shown in FIG. 3 as "LOOPCOUNT") (block 310). In a non-limiting example, the delay invoked by the control circuitry 206 can be 1 ms. The control circuitry 206 then checks the loop counter against the random delay determined in block 305 (block 312). If the loop counter is less than the random delay, the control circuitry 206 returns to block 306. Otherwise, the control circuitry 206 disables the LTSSM (block 314). Subsequently, the control circuitry 206 switches the dual-mode PCIe device 200 to an alternate mode (block 316). In one example, the control circuitry 206 can switch the dual-mode PCIe device 200 to the endpoint mode if the dual-mode PCIe device 200 was in the RC mode prior to disabling the LTSSM in block 314. In another example, the control circuitry 206 can switch the dual-mode PCIe device 200 to the RC mode if the dual-mode PCIe device 200 was in the endpoint mode prior to disabling the LTSSM in block 314. The control circuitry 206 then returns to block 304. The process 300 is thus repeated until the link state indicates that the wire-based PCIe link 204 is up and functional.

Figure 4:
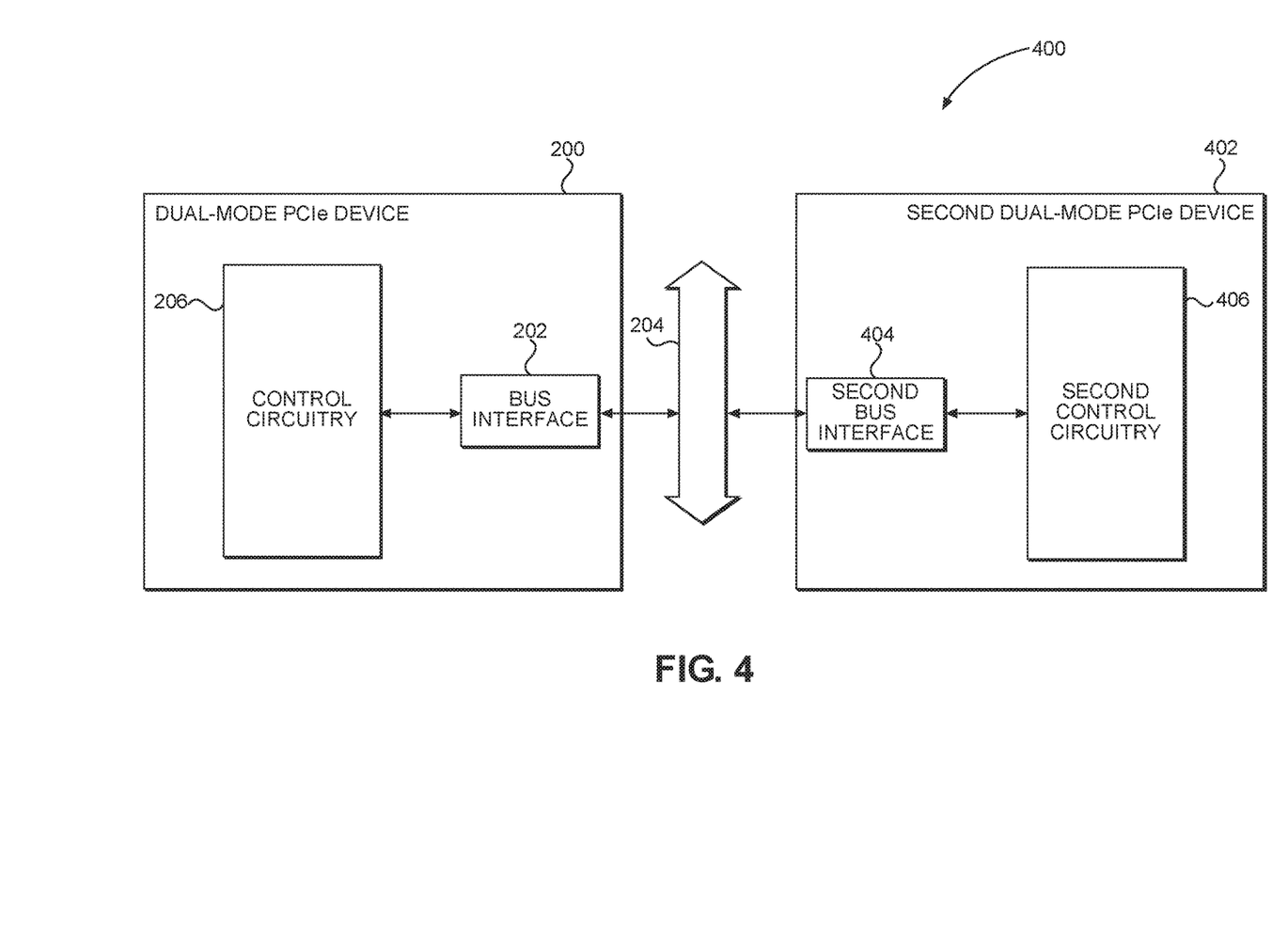
FIG. 4 is a schematic diagram of an exemplary PCIe system configured to resolve link role collision when the dual-mode PCIe device of FIG. 2 and a second dual-mode PCIe device both attempt to perform a configuration and initiation sequence on a wire-based PCIe link concurrently.

With reference back to FIG. 2, in a second non-limiting example, the unsuccessful configuration and initiation of the wire-based PCIe link 204 may be a result of a second dual-mode PCIe device attempting to perform the configuration and initiation sequence on the wire-based PCIe link 204 concurrently. As such, there may be a link role collision when the dual-mode PCIe device 200 and the second dual-mode PCIe device both attempt to configure the wire-based PCIe link 204 in the RC mode concurrently. In this regard, FIG. 4 is a schematic diagram of an exemplary PCIe system 400 configured to resolve the link role collision when the dual-mode PCIe device 200 of FIG. 2 and a second dual-mode PCIe device 402 both attempt to perform the configuration and initiation sequence on the wire-based PCIe link 204 concurrently with the configuration and initiation sequence performed by the dual-mode PCIe device 200. Common elements between FIGS. 2 and 4 are shown therein with common element numbers and will not be re-described herein.

With reference to FIG. 4, the second dual-mode PCIe device 402 includes a second bus interface 404 configured to be coupled to the wire-based PCIe link 204. The second dual-mode PCIe device 402 includes second control circuitry 406 that is communicatively coupled to the wire-based PCIe link 204 via the second bus interface 404. The second control circuitry 406 is configured to determine the link state (i.e., the RC mode or the endpoint mode) of the second dual-mode PCIe device 402 based on a procedure further discussed below.

The second control circuitry 406 first initializes the second dual-mode PCIe device 402 into the RC mode. The second control circuitry 406 then performs a second configuration and initiation sequence on the wire-based PCIe link 204 via the second bus interface 404. According to the PCIe Specification, the second control circuitry 406 may enable a second LTSSM prior to performing the second configuration and initiation sequence on the wire-based PCIe link 204. The second control circuitry 406 determines a second link state of the wire-based PCIe link 204 upon completion of the second configuration and initiation sequence. The second link state of the wire-based PCIe link 204 can be determined based on processes defined in the PCIe Specification.

The second control circuitry 406 invokes a second random back-off or delay when the second link state indicates that the second configuration and initiation sequence performed on the wire-based PCIe link 204 is unsuccessful. In a non-limiting example, the second configuration and initiation sequence can be determined to be unsuccessful when the wire-based PCIe link 204 is not up and functional after the second configuration and initiation sequence is completed. The unsuccessful second configuration and initiation of the wire-based PCIe link 204 can be the result of the dual-mode PCIe device 200 also attempting to configure the wire-based PCIe link 204 in the RC mode concurrently.

With continuing reference to FIG. 4, the second control circuitry 406 is configured to disable the second LTSSM and then switch the second dual-mode PCIe device 402 to the endpoint mode at expiration of the second random delay. In a non-limiting example, the second random delay corresponds to a second temporal delay between 50-100 ms. In another non-limiting example, the second control circuitry 406 can invoke the second random delay after a second delay of 1 ms from determining that the second configuration and initiation sequence performed on the wire-based PCIe link 204 is unsuccessful.

In a non-limiting example, the random delay invoked by the dual-mode PCIe device 200 is shorter than the second random delay invoked by the second dual-mode PCIe device 402. As such, the dual-mode PCIe device 200 switches to operate in the endpoint mode at expiration of the random delay. The second dual-mode PCIe device 402 may subsequently determine that the wire-based PCIe link 204 becomes functional prior to expiration of the second random delay. As such, the link role collision can be resolved and the second dual-mode PCIe device 402 will remain in the RC mode at the expiration of the second random delay. It should be appreciated that the same principles discussed above can also resolve the link role collision when the random delay invoked by the dual-mode PCIe device 200 is longer than the second random delay invoked by the second dual-mode PCIe device 402.

In contrast, the second control circuitry 406 can configure the second dual-mode PCIe device 402 to operate in the RC mode if the second link state indicates that the second configuration and initiation sequence performed on the wire-based PCIe link 204 is successful. Hence, by respectively invoking the random delay and the second random delay at the dual-mode PCIe device 200 and the second dual-mode PCIe device 402, it is possible to resolve the link role collision on the wire-based PCIe link 204.

Figure 5:
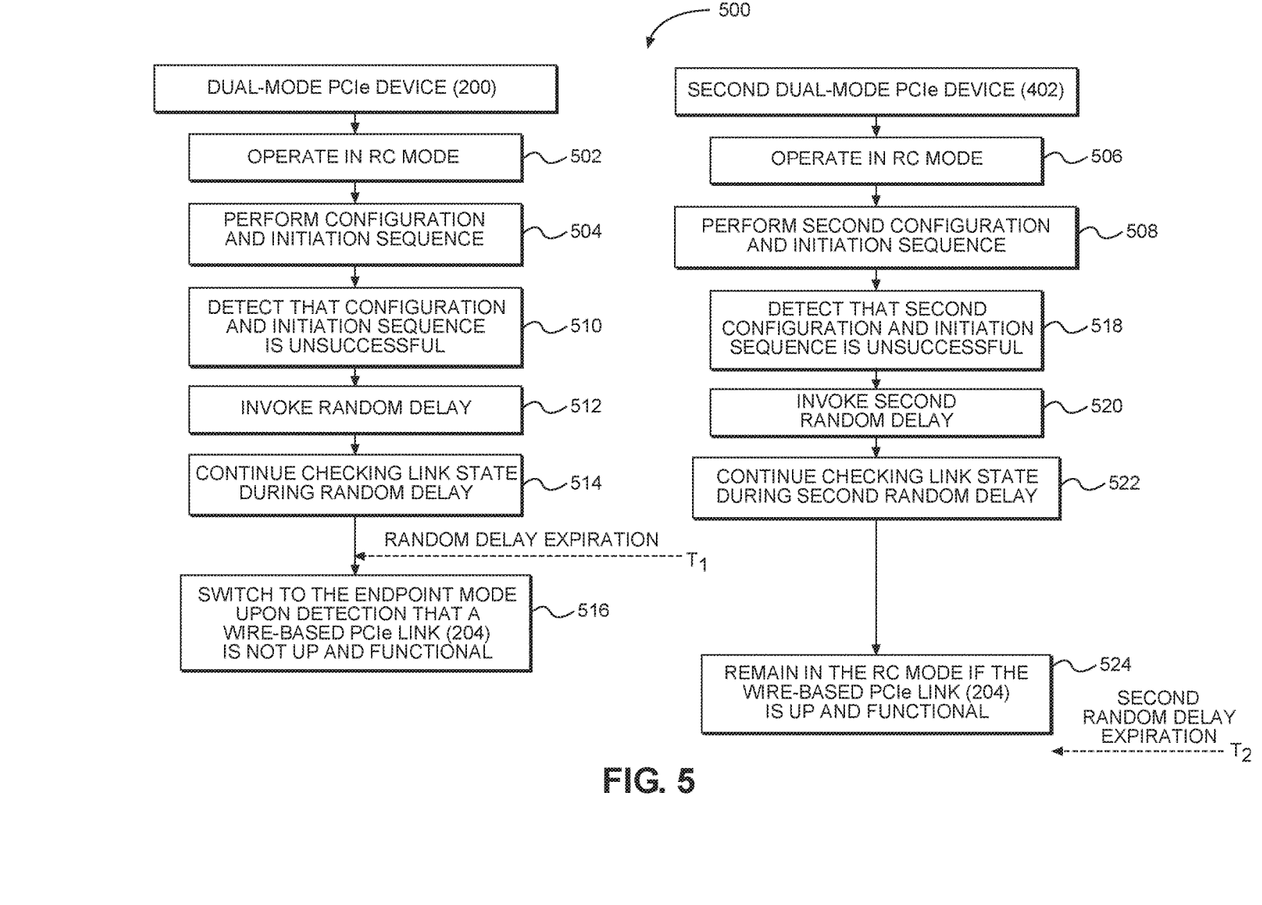
FIG. 5 is a flowchart of an exemplary process that can be employed by the dual-mode PCIe device and the second dual-mode PCIe device of FIG. 4 to resolve link role collision.

The dual-mode PCIe device 200 and the second dual-mode PCIe device 402 can be configured to resolve the link role collision based on a process. In this regard, FIG. 5 illustrates an exemplary process 500 that can be employed by the dual-mode PCIe device 200 and the second dual-mode PCIe device 402 of FIG. 4 to resolve link role collision. For the convenience of discussion, the process 500 is discussed herein based on a non-limiting example in which the random delay invoked by the dual-mode PCIe device 200 expires earlier than the second random delay invoked by the second dual-mode PCIe device 402. It should be appreciated that the process 500 is also applicable vice versa.

With reference to FIG. 5, the dual-mode PCIe device 200 is configured to operate in the RC mode (block 502). The dual-mode PCIe device 200 then performs the configuration and initiation sequence (block 504). The second dual-mode PCIe device 402 is also configured to operate in the RC mode (block 506). The second dual-mode PCIe device 402 then performs the second configuration and initiation sequence (block 508). Because the dual-mode PCIe device 200 and the second dual-mode PCIe device 402 are configured to operate in the RC mode concurrently, link role collision between the dual-mode PCIe device 200 and the second dual-mode PCIe device 402 may occur as a result.

Alternatively, the second dual-mode PCIe device 402 may be preconfigured (e.g., via jumpers and/or registers) to operate in the endpoint mode. In this regard, the second dual-mode PCIe device 402 will attempt to perform the second configuration and initiation sequence in the endpoint mode. As a result, the dual-mode PCIe device 200 would be able to successfully perform the configuration and initiation sequence in the RC mode. Consequently, the dual-mode PCIe device 200 and the second dual-mode PCIe device 402 would operate in the RC mode and the endpoint mode, respectively.

The dual-mode PCIe device 200 detects that the configuration and initiation sequence is unsuccessful (block 510). The dual-mode PCIe device 200 then invokes the random delay (block 512). The dual-mode PCIe device 200 continues checking the link state of the wire-based PCIe link 204 during the random delay (block 514). At time $T_1$, the random delay expires. The dual-mode PCIe device 200 then switches to the endpoint mode upon detection that the wire-based PCIe link 204 is not up and functional (block 516).

Similarly, the second dual-mode PCIe device 402 detects that the second configuration and initiation sequence is unsuccessful (block 518). The second dual-mode PCIe device 402 then invokes the second random delay (block 520). The second dual-mode PCIe device 402 continues checking the link state of the wire-based PCIe link 204 during the second random delay (block 522). According to the same non-limiting example above, the second random delay is longer than the random delay invoked by the dual-mode PCIe device 200. As such, when the second random delay expires at time $T_2$, the dual-mode PCIe device 200 has already switched to the endpoint mode. As a result, the second dual-mode PCIe device 402 will detect that the wire-based PCIe link 204 is up and functional, and thus remain in the RC mode (block 524).

While the processes 300 and 500 illustrate basic concepts of the present disclosure, it should be appreciated that the trigger event for the random delay or the precise timing of when the random delay is selected may be varied. One such alternate timing is provided in process 600 with reference to FIG. 6. Initially, the controller or the control circuitry 206 of the dual-mode PCIe device 200 is initialized into the RC mode (block 602). The control circuitry 206 then enables the LTSSM to perform the link training of the LTSSM as described in the PCIe Specification (block 604). Upon completion of the configuration and initiation sequence, the control circuitry 206 sets a loop counter to zero (0) (block 606). The control circuitry 206 then checks the link state (block 608) to see if the link is up (block 610). If the link is not up, the control circuitry 206 causes a delay and increments the loop counter (block 612) before checking to see if the loop counter is greater than a random number (block 614). As explained above, this random number may represent a random delay of between 50-100 ms. If the answer to block 614 is no, then the process repeats at block 608.

Figure 6:
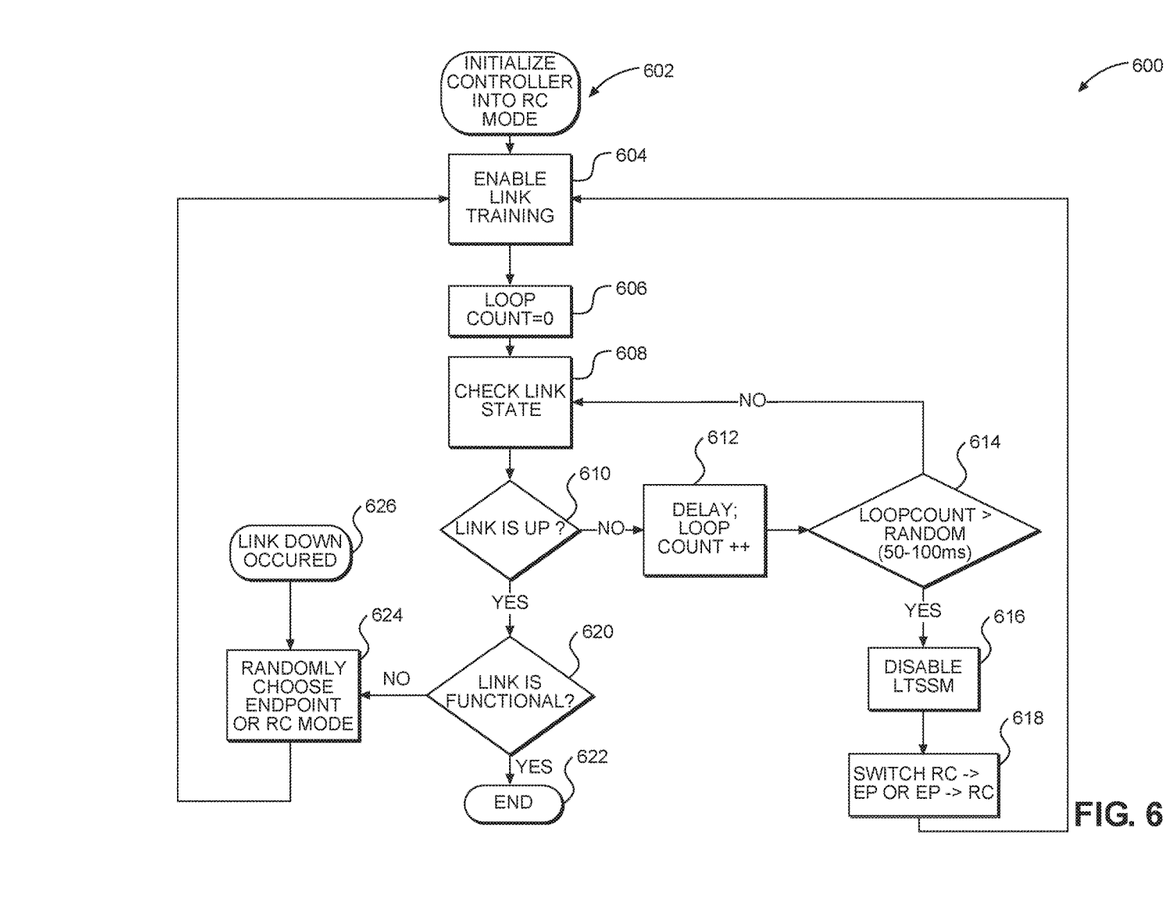
FIG. 6 is a flowchart of another exemplary process that can be performed by control circuitry in the dual-mode PCIe device of FIG. 2 to configure the dual-mode PCIe device to operate in the RC mode or the endpoint mode.

With continued reference to FIG. 6, if the answer to block 614 is yes, the random delay has been exceeded, then the control circuitry 206 disables the LTSSM (block 616) and switches the dual-mode PCIe device 200 to an alternate mode (block 618). In one example, the control circuitry 206 can switch the dual-mode PCIe device 200 to the endpoint mode if the dual-mode PCIe device 200 was in the RC mode prior to disabling the LTSSM in block 616. In another example, the control circuitry 206 can switch the dual-mode PCIe device 200 to the RC mode if the dual-mode PCIe device 200 was in the endpoint mode prior to disabling the LTSSM in block 616. The control circuitry 206 then returns to block 608. The process 600 is thus repeated until the link state indicates that the wire-based PCIe link 204 is up and functional.

With continued reference to FIG. 6, if the link is up at block 610, the process 600 determines if the link is functional (block 620). If the link is functional, the process 600 ends (block 622). If the link is not functional at block 620, then the control circuitry 206 randomly chooses to operate in the endpoint or RC mode (block 624) and returns the process 600 to block 604. Note that if the link goes down for other reasons (block 626), then the random selection of block 624 may also occur.

The dual-mode PCIe device 200 of FIG. 2 according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
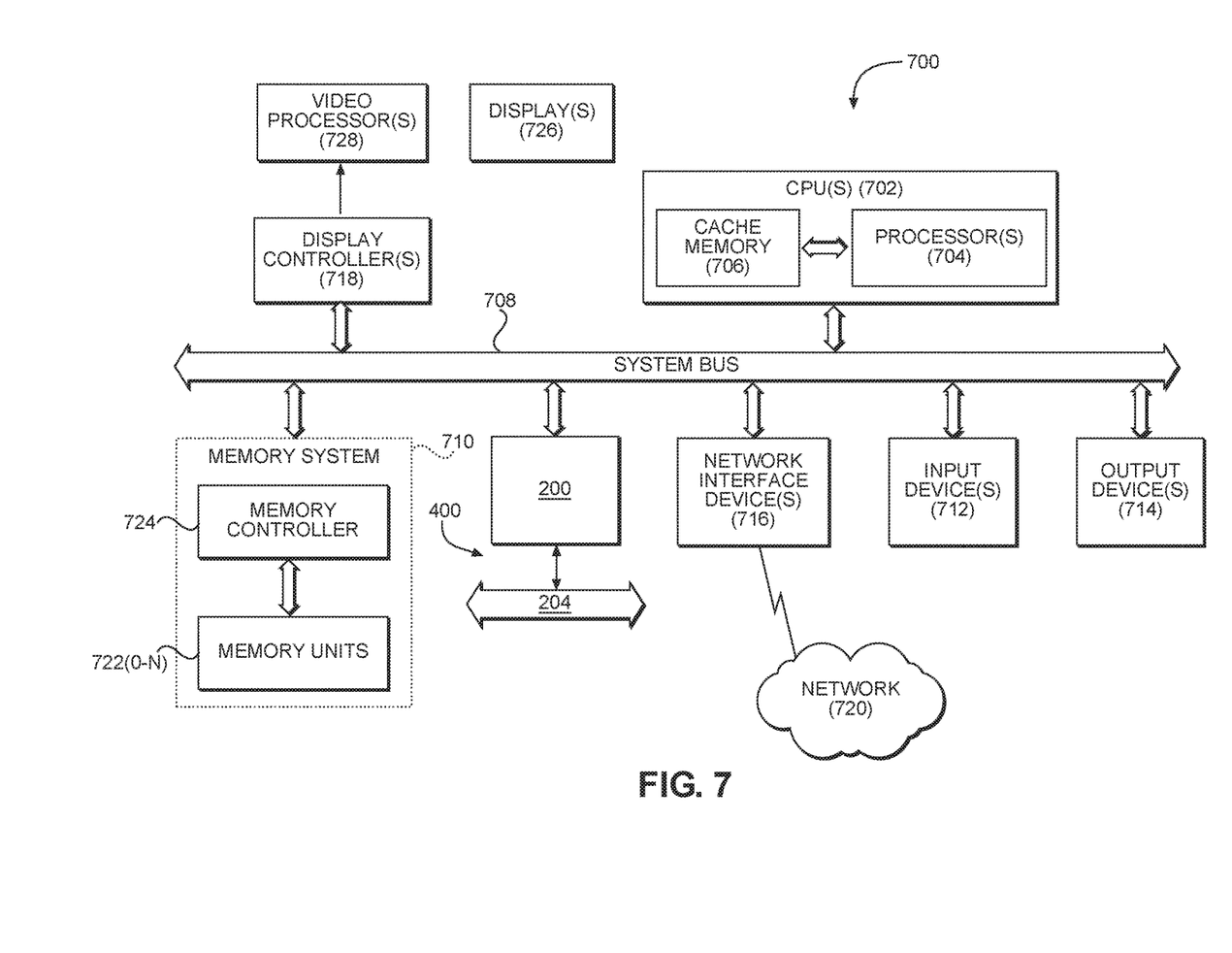
FIG. 7 is a block diagram of an exemplary processor-based system that can include the dual-mode PCIe device of FIG. 2 and the PCIe system of FIG. 4.

In this regard, FIG. 7 illustrates an example of a processor-based system 700 that can support the dual-mode PCIe device 200 of FIG. 2 and the PCIe system 400 of FIG. 4. In this example, the processor-based system 700 includes one or more central processing units (CPUs) 702, each including one or more processors 704. The CPU(s) 702 may have cache memory 706 coupled to the processor(s) 704 for rapid access to temporarily stored data. The CPU(s) 702 is coupled to a system bus 708. As is well known, the CPU(s) 702 communicates with other devices by exchanging address, control, and data information over the system bus 708. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 710, one or more input devices 712, one or more output devices 714, one or more network interface devices 716, and one or more display controllers 718, as examples. The input device(s) 712 can include any type of input device, including, but not limited to, input keys, switches, voice processors, etc. The output device(s) 714 can include any type of output device, including, but not limited to, audio, video, other visual indicators, etc. The network interface device(s) 716 can be any device configured to allow exchange of data to and from a network 720. The network 720 can be any type of network, including networks such as the phone network or the Internet. The network interface device(s) 716 can be configured to support any type of communications protocol desired. The memory system 710 can include one or more memory units 722(0-N) and a memory controller 724.

The CPU(s) 702 may also be configured to access the display controller(s) 718 over the system bus 708 to control information sent to one or more displays 726. The display controller(s) 718 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A dual-mode Peripheral Component Interconnect express (PCIe) device configured to operate in a root complex (RC) mode or an endpoint mode, comprising:
    a bus interface configured to be coupled to a wire-based PCIe link; and
    control circuitry configured to:
        initialize the dual-mode PCIe device into the RC mode;
        perform a configuration and initiation sequence on the wire-based PCIe link via the bus interface;
        determine a link state of the wire-based PCIe link upon completion of the configuration and initiation sequence;
        use a random delay when the link state indicates that the configuration and initiation sequence performed on the wire-based PCIe link is unsuccessful; and
        switch the dual-mode PCIe device to the endpoint mode at expiration of the random delay.

2. The dual-mode PCIe device of claim 1, wherein the control circuitry is further configured to configure the dual-mode PCIe device to operate in the RC mode when the link state indicates that the configuration and initiation sequence performed on the wire-based PCIe link is successful.

3. The dual-mode PCIe device of claim 1, wherein the control circuitry is further configured to:
    determine the link state of the wire-based PCIe link after switching the dual-mode PCIe device to the endpoint mode at the expiration of the random delay;
    use the random delay when the link state indicates that the configuration and initiation sequence performed on the wire-based PCIe link is unsuccessful; and
    switch the dual-mode PCIe device to the RC mode at the expiration of the random delay.

4. The dual-mode PCIe device of claim 3, wherein the control circuitry is further configured to configure the dual-mode PCIe device to operate in the endpoint mode when the link state indicates that the configuration and initiation sequence performed on the wire-based PCIe link is successful.

5. The dual-mode PCIe device of claim 1, wherein the control circuitry is configured to use the random delay after a delay of one millisecond from determining that the configuration and initiation sequence performed on the wire-based PCIe link is unsuccessful.

6. The dual-mode PCIe device of claim 1, wherein the control circuitry is configured to use the random delay corresponding to a temporal delay between fifty and one hundred milliseconds.

7. The dual-mode PCIe device of claim 1, wherein the control circuitry is further configured to enable a Link Training and Status state machine (LTSSM) prior to performing the configuration and initiation sequence on the wire-based PCIe link.

8. The dual-mode PCIe device of claim 7, wherein the control circuitry is further configured to disable the LTSSM prior to initializing the dual-mode PCIe device into the endpoint mode.

9. The dual-mode PCIe device of claim 1 integrated into an integrated circuit (IC).

10. The dual-mode PCIe device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device (e.g., a smart watch, a health or fitness tracker, eyewear, etc.); a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A method for configuring a dual-mode Peripheral Component Interconnect express (PCIe) device to operate in a root complex (RC) mode or an endpoint mode, comprising:
  initializing the dual-mode PCIe device into the RC mode;
  performing a configuration and initiation sequence on a wire-based PCIe link coupled to the dual-mode PCIe device;
  determining a link state of the wire-based PCIe link upon completion of the configuration and initiation sequence;
  using a random delay when the link state indicates that the configuration and initiation sequence performed on the wire-based PCIe link is unsuccessful; and
  switching the dual-mode PCIe device to the endpoint mode at expiration of the random delay.

12. The method of claim 11, further comprising configuring the dual-mode PCIe device to operate in the RC mode when the link state indicates that the configuration and initiation sequence performed on the wire-based PCIe link is successful.

13. The method of claim 11, further comprising:
  determining the link state of the wire-based PCIe link after switching the dual-mode PCIe device to the endpoint mode at the expiration of the random delay;
  using the random delay when the link state indicates that the configuration and initiation sequence performed on the wire-based PCIe link is unsuccessful; and
  switching the dual-mode PCIe device to the RC mode at the expiration of the random delay.

14. The method of claim 13, further comprising configuring the dual-mode PCIe device to operate in the endpoint mode when the link state indicates that the configuration and initiation sequence performed on the wire-based PCIe link is successful.

15. The method of claim 11, further comprising using the random delay after a delay of one millisecond from determining that the configuration and initiation sequence performed on the wire-based PCIe link is unsuccessful.

16. The method of claim 11, further comprising using the random delay corresponding to a temporal delay between fifty and one hundred milliseconds.

17. The method of claim 11, further comprising enabling a Link Training and Status state machine (LTSSM) prior to performing the configuration and initiation sequence on the wire-based PCIe link.

18. The method of claim 17, further comprising disabling the LTSSM prior to initializing the dual-mode PCIe device into the endpoint mode.

19. A Peripheral Component Interconnect express (PCIe) system, comprising:
  a dual-mode PCIe device configured to operate in a root complex (RC) mode or an endpoint mode, comprising:
    a bus interface configured to be coupled to a wire-based PCIe link; and
    control circuitry configured to:
      initialize the dual-mode PCIe device into the RC mode;
      perform a configuration and initiation sequence on the wire-based PCIe link via the bus interface;
      determine a link state of the wire-based PCIe link upon completion of the configuration and initiation sequence;
      use a random delay when the link state indicates that the configuration and initiation sequence performed on the wire-based PCIe link is unsuccessful; and
      switch the dual-mode PCIe device to the endpoint mode at expiration of the random delay; and
  a second dual-mode PCIe device configured to operate in the RC mode or the endpoint mode, comprising:
    a second bus interface configured to be coupled to the wire-based PCIe link; and
    second control circuitry configured to:
      initialize the second dual-mode PCIe device into the RC mode;
      perform a second configuration and initiation sequence on the wire-based PCIe link via the second bus interface;
      determine a second link state of the wire-based PCIe link upon completion of the second configuration and initiation sequence;
      use a second random delay when the second link state indicates that the second configuration and initiation sequence performed on the wire-based PCIe link is unsuccessful; and
      switch the second dual-mode PCIe device to the endpoint mode at expiration of the second random delay.

20. The PCIe system of claim 19, wherein the control circuitry is further configured to configure the dual-mode PCIe device to operate in the RC mode when the link state indicates that the configuration and initiation sequence performed on the wire-based PCIe link is successful.

21. The PCIe system of claim 19, wherein the control circuitry is further configured to:
  determine the link state of the wire-based PCIe link after switching the dual-mode PCIe device to the endpoint mode at the expiration of the random delay;
  use the random delay when the link state indicates that the configuration and initiation sequence performed on the wire-based PCIe link is unsuccessful; and
  switch the dual-mode PCIe device to the RC mode at the expiration of the random delay.

22. The PCIe system of claim 21, wherein the control circuitry is further configured to configure the dual-mode PCIe device to operate in the endpoint mode when the link state indicates that the configuration and initiation sequence performed on the wire-based PCIe link is successful.

23. The PCIe system of claim 19, wherein the control circuitry is configured to use the random delay after a delay of one millisecond from determining that the configuration and initiation sequence performed on the wire-based PCIe link is unsuccessful.

24. The PCIe system of claim 19, wherein the control circuitry is configured to use the random delay corresponding to a temporal delay between fifty and one hundred milliseconds.

25. The PCIe system of claim 19, wherein the control circuitry is further configured to enable a Link Training and Status state machine (LTSSM) prior to performing the configuration and initiation sequence on the wire-based PCIe link.

26. The PCIe system of claim 25, wherein the control circuitry is further configured to disable the LTSSM prior to initializing the dual-mode PCIe device into the endpoint mode.

27. The PCIe system of claim 19, wherein the second control circuitry is further configured to configure the second dual-mode PCIe device to operate in the RC mode when the second link state indicates that the second configuration and initiation sequence performed on the wire-based PCIe link is successful.

28. The PCIe system of claim 19, wherein the second control circuitry is further configured to:
- determine the second link state of the wire-based PCIe link after switching the second dual-mode PCIe device to the endpoint mode at the expiration of the second random delay;
- use the second random delay when the second link state indicates that the second configuration and initiation sequence performed on the wire-based PCIe link is unsuccessful; and
- switch the second dual-mode PCIe device to the RC mode at the expiration of the second random delay.

29. The PCIe system of claim 28, wherein the second control circuitry is further configured to configure the second dual-mode PCIe device to operate in the endpoint mode when the second link state indicates that the second configuration and initiation sequence performed on the wire-based PCIe link is successful.

30. A dual-mode Peripheral Component Interconnect express (PCIe) device configured to switch dynamically between a root complex (RC) mode and an endpoint mode, comprising:
- a bus interface configured to be coupled to a wire-based PCIe link; and
- control circuitry configured to:
  - initialize the dual-mode PCIe device into the RC mode;
  - perform a configuration and initiation sequence on the wire-based PCIe link via the bus interface;
  - determine a link state of the wire-based PCIe link upon completion of the configuration and initiation sequence; and
  - switch to the endpoint mode when the link state indicates that the configuration and initiation sequence performed on the wire-based PCIe link is unsuccessful and after expiration of a delay.

* * * * *